United States Patent
Zhao et al.

(10) Patent No.: US 11,074,794 B2
(45) Date of Patent: Jul. 27, 2021

(54) SYSTEMS AND METHODS FOR ACTIVATING AND DEACTIVATING CONTROLLED DEVICES IN A SECURED AREA

(71) Applicant: Ademco Inc., Golden Valley, MN (US)

(72) Inventors: Tianfeng Zhao, Shenzhen (CN); Huayu Li, Shenzhen (CN); Lei Qin, Shenzhen (CN)

(73) Assignee: Ademco Inc., Golden Valley, MN (US)

( * ) Notice: Subject to any disclaimer, the term of this patent is extended or adjusted under 35 U.S.C. 154(b) by 137 days.

(21) Appl. No.: 16/205,608

(22) Filed: Nov. 30, 2018

(65) Prior Publication Data

US 2020/0174452 A1 Jun. 4, 2020

(51) Int. Cl.
*G08B 13/24* (2006.01)
*G08B 29/04* (2006.01)
*H04L 29/08* (2006.01)

(52) U.S. Cl.
CPC ..... *G08B 13/2491* (2013.01); *G08B 13/2494* (2013.01); *G08B 29/04* (2013.01); *H04L 67/10* (2013.01)

(58) Field of Classification Search
CPC ................ G05B 19/4155; G08C 17/02; G08B 13/2494; G08B 29/04
USPC ........................................................ 700/28
See application file for complete search history.

(56) References Cited

U.S. PATENT DOCUMENTS

| | | | |
|---|---|---|---|
| 4,191,953 A | 3/1980 | Woode | |
| 4,527,151 A | 7/1985 | Byrne | |
| 5,331,308 A | 7/1994 | Buccola et al. | |
| 5,781,108 A | 7/1998 | Jacob et al. | |
| 5,839,096 A * | 11/1998 | Lyons | G01S 7/4008 702/183 |
| 5,936,524 A * | 8/1999 | Zhevelev | G08B 29/046 340/552 |
| 6,353,385 B1 | 3/2002 | Molini et al. | |
| 6,778,092 B2 | 8/2004 | Braune | |

(Continued)

FOREIGN PATENT DOCUMENTS

| | | |
|---|---|---|
| CA | 2 351 138 A1 | 12/2002 |
| EP | 1 968 024 A1 | 9/2008 |

(Continued)

OTHER PUBLICATIONS

Stanley—SU 100 Motion Sensor—© 2000.

(Continued)

*Primary Examiner* — Mohammad Ali
*Assistant Examiner* — Joshua T Sanders
(74) *Attorney, Agent, or Firm* — Fredrikson & Byron, P.A.

(57) ABSTRACT

Systems and methods for activating and deactivating controlled devices are provided. Such systems and methods can include a microprocessor unit sampling signal data from a smart microwave sensor module to detect a presence of a user within a secured area, using the signal data to track a route of the user within the secured area, and activating or deactivating the controlled devices located within the secured area based on a location of an end of the route. Such systems and methods can include activating the controlled devices when the location of the end of the route is within the secured area and deactivating the controlled devices when the location of the end of the route is not outside of the secured area.

16 Claims, 4 Drawing Sheets

(56) References Cited

U.S. PATENT DOCUMENTS

| | | |
|---|---|---|
| 6,943,685 B2 | 9/2005 | Seo |
| 6,992,577 B2 | 1/2006 | Tsuji et al. |
| 7,084,761 B2 | 8/2006 | Izumi et al. |
| 7,274,387 B2 | 9/2007 | Gupta et al. |
| 7,327,253 B2 | 2/2008 | Whitten et al. |
| 7,463,182 B1 | 12/2008 | Morinaga et al. |
| 7,636,039 B2 | 12/2009 | Babich |
| 7,679,509 B2 | 3/2010 | Royer |
| 8,102,261 B2 | 1/2012 | Wu |
| 8,432,448 B2 | 4/2013 | Hassapis et al. |
| 8,519,883 B2 | 8/2013 | Drake et al. |
| 9,125,144 B1 | 9/2015 | Orbach et al. |
| 9,189,751 B2 | 11/2015 | Matsuoka et al. |
| 9,237,315 B2 | 1/2016 | Naylor et al. |
| 9,498,885 B2 | 11/2016 | Scott et al. |
| 9,655,217 B2 | 5/2017 | Recker et al. |
| 2002/0175815 A1 | 11/2002 | Baldwin |
| 2003/0030557 A1 | 2/2003 | Progovac et al. |
| 2003/0112142 A1* | 6/2003 | Izumi .................. G01S 13/04 340/552 |
| 2005/0128067 A1 | 6/2005 | Zakrewski |
| 2006/0125621 A1* | 6/2006 | Babich ................. G08B 29/14 340/514 |
| 2006/0139164 A1 | 6/2006 | Tsuji |
| 2007/0018106 A1 | 1/2007 | Zhevelev et al. |
| 2007/0115164 A1 | 5/2007 | Wu et al. |
| 2007/0176765 A1 | 8/2007 | Babich et al. |
| 2007/0252720 A1 | 11/2007 | Hughes et al. |
| 2007/0253461 A1 | 11/2007 | Billington et al. |
| 2008/0100498 A1 | 5/2008 | Fullerton et al. |
| 2008/0218339 A1 | 9/2008 | Royer |
| 2008/0218340 A1 | 9/2008 | Royer |
| 2008/0310254 A1 | 12/2008 | Piel et al. |
| 2009/0051529 A1 | 2/2009 | Tsuji |
| 2010/0013636 A1 | 1/2010 | Wu |
| 2010/0201267 A1* | 8/2010 | Bourquin ............. H05B 47/175 315/32 |
| 2010/0201527 A1 | 8/2010 | Jensen et al. |
| 2010/0201787 A1 | 8/2010 | Zehavi |
| 2013/0300566 A1 | 11/2013 | Kumfer et al. |
| 2015/0212205 A1 | 7/2015 | Shpater |
| 2015/0276238 A1* | 10/2015 | Matsuoka ............ F24D 19/1081 700/278 |
| 2015/0369618 A1 | 12/2015 | Barnard et al. |
| 2016/0226892 A1 | 8/2016 | Sen et al. |
| 2016/0240056 A1 | 8/2016 | Chen |
| 2017/0059197 A1* | 3/2017 | Goyal ................... G05D 23/19 |
| 2017/0103648 A1 | 4/2017 | Bodurka |
| 2017/0328997 A1* | 11/2017 | Silverstein ............. G01S 13/87 |
| 2019/0086266 A1 | 3/2019 | Lin et al. |

FOREIGN PATENT DOCUMENTS

| | | |
|---|---|---|
| EP | 2 260 563 B1 | 10/2011 |
| EP | 3 355 289 A1 | 8/2018 |
| ES | 1 006 935 U | 1/1989 |
| GB | 2 078 413 A | 1/1982 |
| TW | 201915660 A1 | 4/2019 |

OTHER PUBLICATIONS

Rytec Corporation—Motion Detector—Installation and Operating Instructions, Revision: Jan. 21, 2003.

Extended European search report for related EP patent application 18183507.5, dated Oct. 26, 2018.

Extended European search report for related EP patent application 18153319.1, dated May 8, 2018.

Office action for related CA patent application 2,992,039, dated Sep. 25, 2018.

T.K. Hareendran, HB100 Microwave Motion Sensor—An Introduction, Electro Schematics, © 2017.

United States Nuclear Regulatory Commission, Office of Nuclear Security and Incident Response, Intrusion Detection Systems and Subsystems, Technical Information for NRC Licensees, Published Mar. 2011.

Essential Video Analytics 6.30, @ Bosch Security Systems 2017, V3, Feb. 16, 2017, www.boschsecurity.com.

Extended European Search Report from EP patent application 19211966.7, dated Mar. 11, 2020.

English-language translation of TW patent 201915660, dated Apr. 16, 2019.

Extended European Search Report for corresponding EP patent application 19211968.3, dated Mar. 13, 2020.

English language translation of ES patent publication 1 006 935 U, dated Jan. 16, 1989.

* cited by examiner

SYSTEMS AND METHODS FOR ACTIVATING AND DEACTIVATING CONTROLLED DEVICES IN A SECURED AREA

FIELD

The present invention relates generally to device control systems. More particularly, the present invention relates to systems and methods for activating and deactivating controlled devices in a secured area based on a location of an end of a route for a user tracked within the secured area.

BACKGROUND

Known systems and methods for activating and deactivating controlled devices based on a presence of a user are susceptible to false alarms and failure to detect the user in a secured area. For example, such known systems and methods may falsely indicate the presence of the user due to hot air, vibrations, a flash of light, or the like, thereby triggering unnecessary activation of the controlled devices, or falsely indicate a non-presence of the user, thereby causing premature deactivation of the controlled devices.

In view of the above, there is a continuing, ongoing need for improved systems and methods.

DETAILED DESCRIPTION

Figure 1:
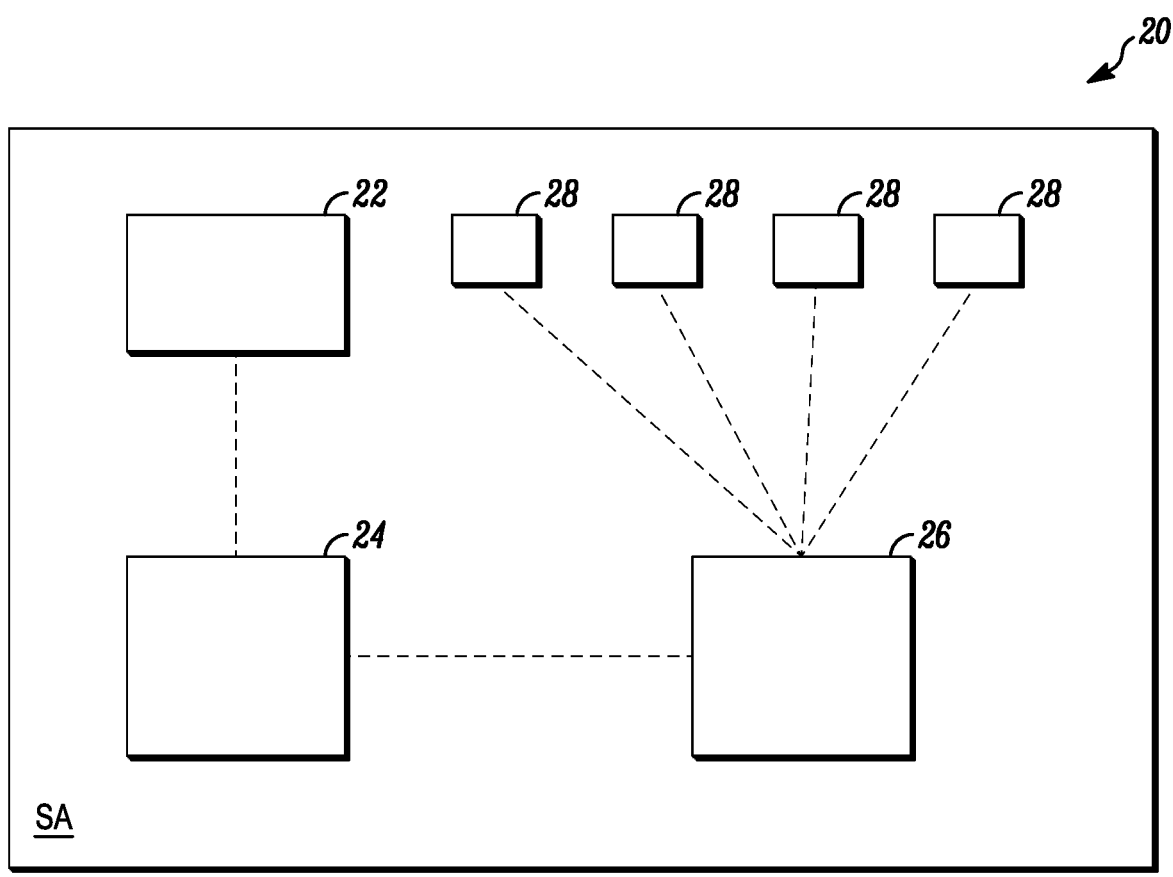
FIG. 1 is a block diagram of a device control system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for activating and deactivating controlled devices by monitoring a secured area and determining and verifying a presence of a user within the secured area, for example, by identifying a velocity, a position, and a moving direction of the user. In some embodiments, systems and methods disclosed herein may include a microprocessor unit sampling sensor data from a smart microwave sensor module to detect the sensor data indicative of the presence of the user, use the sensor data to track a route for the user within the secured area, and activate or deactivate the controlled devices located within the secured area based on a location of an end of the route.

Systems and methods disclosed herein are described in connection with a device control system. It is to be understood that such a device control system may include, but is not limited to the smart microwave sensor module, the microprocessor unit electrically connected to the smart microwave sensor module, and a device controller deployed in the secured area or at a location that is remote from the secured area. However, it is to be understood that systems and methods disclosed herein are not so limited and may be used in connection with other systems, including home automation systems and security systems with security alarms. In particular, systems and methods disclosed herein can be used in connection with or as modifications to the systems and methods disclosed in U.S. application Ser. No. 16/001,360 titled "SYSTEMS AND METHODS FOR DETERMINING AND VERIFYING A PRESENCE OF AN OBJECT OR AN INTRUDER IN A SECURED AREA" filed on Jun. 6, 2018. U.S. application Ser. No. 16/001,360 is assigned to the assignee hereof and is hereby incorporated by reference.

In accordance with disclosed embodiments, the microprocessor unit may sample first sensor data from the smart microwave sensor module to detect the presence of the user within the secured area. In some embodiments, the microprocessor unit may use the first sensor data to calculate the velocity of the user, a distance of the user from the smart microwave sensor module, and the moving direction of the user. For example, in some embodiments, the microprocessor unit can employ known techniques relating to smart microwave Doppler theory with related algorithmic processing to calculate the velocity, the distance, and the moving direction.

In some embodiments the controlled devices can be activated when the location of the end of the route is within the secured area and deactivated when the location of the end of the route is outside of the secured area. For example, the microprocessor unit can use the first sensor data to calculate and transmit route data indicative of the end of the route to the device controller, which can activate or deactivate the controlled devices based on whether the location of the end of the route is within or outside of the secured area. In some embodiments, the device controller can include a cloud server remote from the secured area.

In some embodiments, deactivating the controlled devices can include automatically cutting off power to the controlled devices, and in some embodiments, activating the controlled devices can include granting the user control over the controlled devices. In some embodiments, the controlled devices can include, but are not limited to climate control units, air conditioners, heaters, light sources, printers, and phones.

In some embodiments, the secured area can be defined by a designated protection territory of the smart microwave sensor module. In these embodiments, the microprocessor unit can receive user input adjusting the designated protection territory and can verify that the designated protection territory conforms to the user input.

It is to be understood that each of the microprocessor unit, the device controller, and the controlled devices disclosed herein can include a respective transceiver device and a respective memory device, each of which can be in communication with respective control circuitry, one or more respective programmable processors, and respective executable control software as would be understood by one of ordinary skill in the art. In some embodiments, the respective executable control software of each of the microprocessor unit, the device controller, and the controlled devices can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective executable control software of each of the microprocessor unit, the device controller, and the controlled devices can execute and control at least some of the methods disclosed herein.

Figure 2:
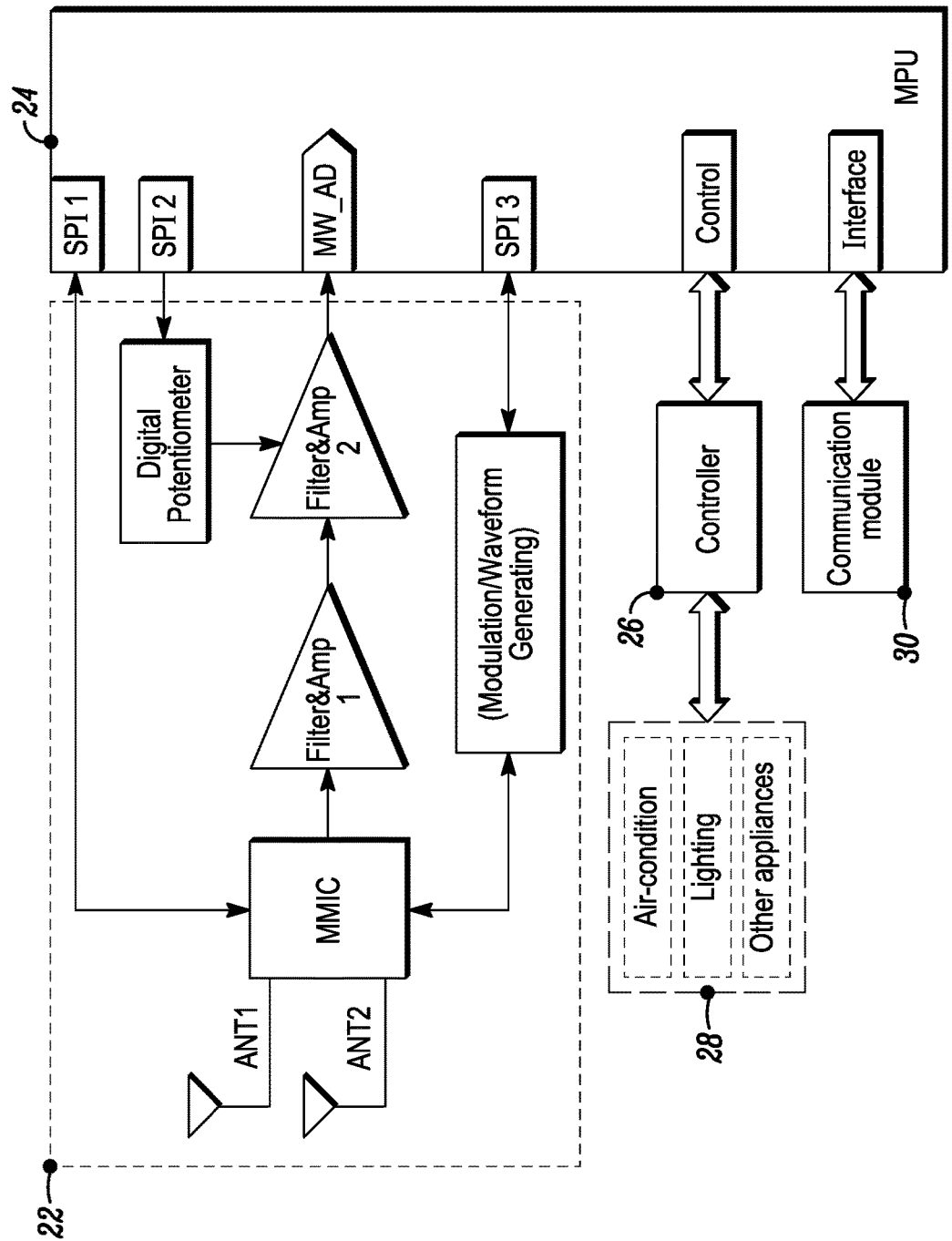
FIG. 2 is a block diagram of a device control system in accordance with disclosed embodiments.

FIG. 1 and FIG. 2 are block diagrams of a device control system 20 in accordance with disclosed embodiments. As seen in FIG. 1, the device control system 20 may include a smart microwave sensor module 22, a microprocessor unit 24, a device controller 26 in communication with the microprocessor unit 24, and a plurality of controlled devices 28. In some embodiments, each of the smart microwave sensor module 22, the microprocessor unit 24, the device controller 26, and the plurality of controlled devices 28 can be deployed in a secured area SA, and in some embodiments, the device controller 26 can include a cloud server that is remote from the secured area SA.

As seen in FIG. 2, the smart microwave sensor module 22 may include transmitting and receiving antennas, a Monolithic Microwave Integrated Circuit (MMIC), two-level signal-processing circuits, such as filters and amplifiers, a digital potentiometer to adjust a gain of a microwave intermediate frequency signal output from the two-level signal-processing circuits, and a modulation/waveform generating module. In some embodiments, the microprocessor unit 24 may control the modulation/waveform generating module to transmit a VCO control signal to drive the MMIC. Furthermore, in some embodiments, the microprocessor unit 24 may sample the microwave intermediate frequency signal output from the two-level signal-processing circuits to determine whether a user is present within the secured area SA and to use in tracking a route of the user within the secured area SA. As seen in FIG. 2, the device control system 20 may also include a communication module 30 for use in dual direction data transferring, such as linking to a cloud server and receiving commands for the controlled devices 28 from the user.

Figure 3:
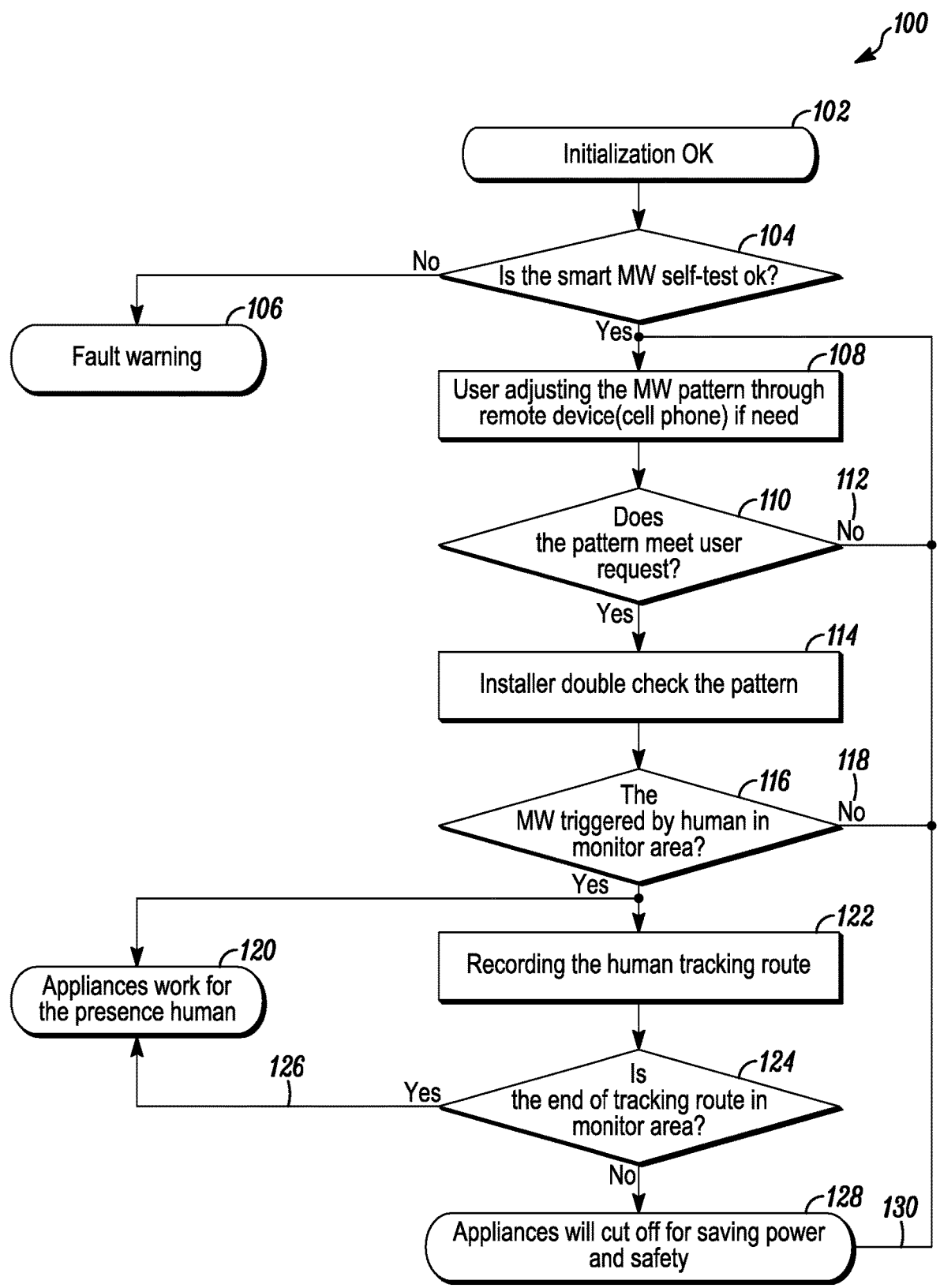
FIG. 3 is a flow diagram of a method in accordance with disclosed embodiments.

FIG. 3 is a flow diagram of a method 100 in accordance with disclosed embodiments. As seen in FIG. 3, the method 100 can include the microprocessor unit 24 conducting a self-test of the smart microwave sensor module 22, as in 104, and when the self-test fails, outputting a fault warning, as in 106. When the self-test passes, the method 100 can include the microprocessor unit 24 receiving user input adjusting a pattern or a designated protection territory of the smart microwave sensor 22, as in 108, and verifying whether the pattern or the designated protection territory matches the user input, as in 110. When the pattern or the designated protection territory fails to match the user input, the method 100 can continue receiving the user input, as in 112. However, when the pattern or the designated protection territory matches the user input, the method 100 can include prompting an installer to double check the pattern or the designated protection territory, as in 114.

Then, the method 100 can include determining whether the smart microwave sensor module 22 has been triggered by a user within the secured area SA, as in 116. When the smart microwave sensor module 22 has not been triggered, the method 100 can include continuing to receive the user input, as in 118. However, when the smart microwave sensor module 22 is triggered, the method 100 can include the microprocessor unit 24 activating the controlled devices 28, as in 120, tracking a route of the user, as in 122, and determining whether a location of an end of the route is within the secured area SA, as in 124. When the location of the end of the route is within the secured area, the method 100 can include keeping the controlled devices 28 activated, as in 126. However, when the location of the end of the route is outside of the secured area SA, the method 100 can include cutting off power to the controlled devices 28, as in 128, and continuing to receive the user input, as in 130.

FIG. 4A-FIG. 4D are diagrams of simulated tracking scenarios for a user 34 in accordance with disclosed embodiments. As seen, the secured area SA can be defined by a pattern or a designated protection territory 30, and a user 34 can enter and exit the secured area SA at identical locations and traverse a route 32 that is simple/uncomplicated, as in FIG. 4A, can enter and exit the secured area SA at different locations and traverse a route 36 that is complicated, as in FIG. 4B, or can enter and exit the secured area SA at identical locations and traverse a route 38 that is simple/uncomplicated, as in FIG. 4C. Other entrance and exit locations and other routes as would be understood by those of ordinary skill in the art are contemplated and within the spirit and scope of systems and methods disclosed herein. In any of FIG. 4A-4C or like scenarios, the device control system 20 can deactivate the controlled devices 28 responsive to determining that the route 32, 36, 38 extends or ends outside of a boundary of the pattern or the designated protection territory 30.

Figure 4A:
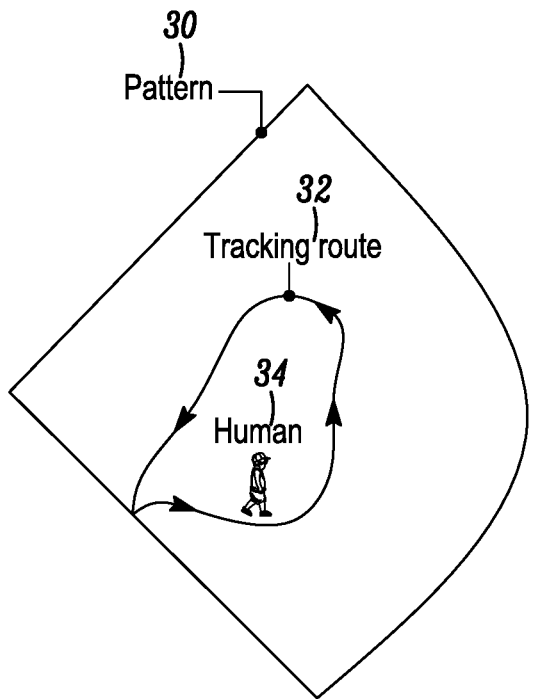
FIG. 4A is a diagram of a simulated tracking scenario in accordance with disclosed embodiments.
Figure 4B:
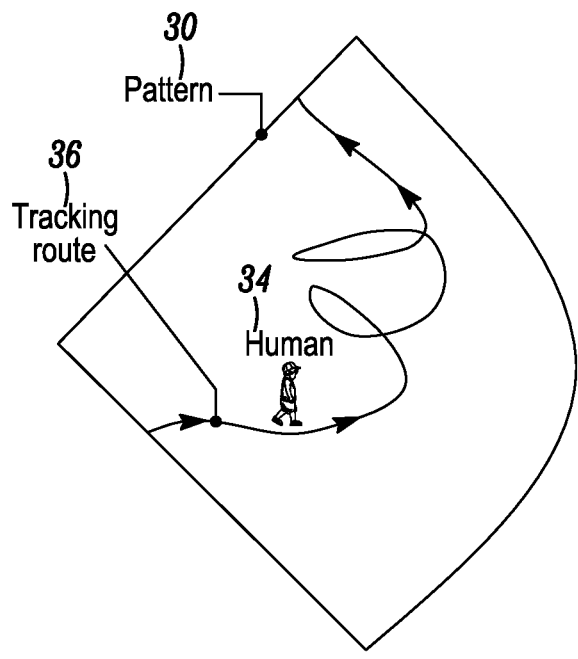
FIG. 4B is a diagram of a simulated tracking scenario in accordance with disclosed embodiments.
Figure 4C:
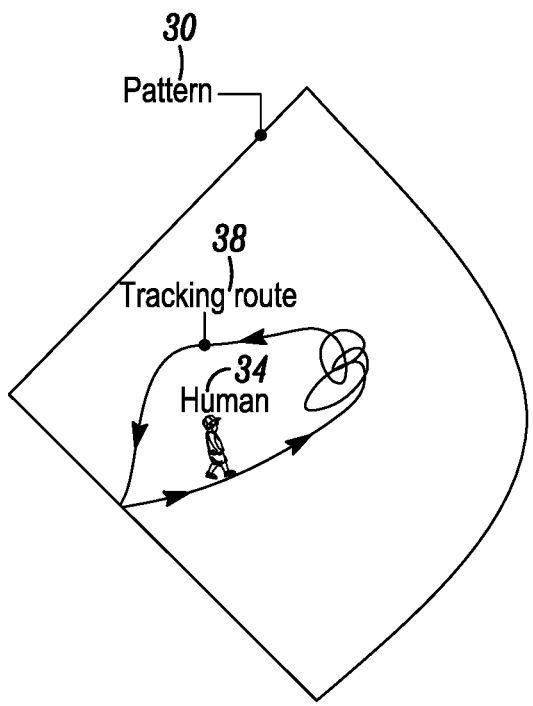
FIG. 4C is a diagram of a simulated tracking scenario in accordance with disclosed embodiments.
Figure 4D:
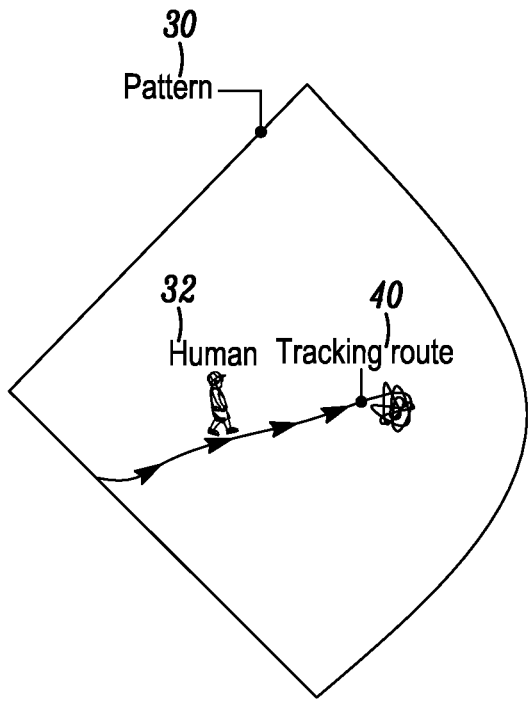
FIG. 4D is a diagram of a simulated tracking scenario in accordance with disclosed embodiments.

Conversely, as seen in FIG. 4D, the user 34 can enter the secured area SA, traverse a route 40 and end the route 40 within the secured area SA. Accordingly, in FIG. 4D, the device control system 20 can activate the controlled devices 28 or keep the controlled devices 28 activated responsive to determining that the route 40 ends within the boundary of the pattern or the designated protection territory 30.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

conducting a self-test of a smart microwave sensor module;

when the self-test fails, outputting a fault warning;

when the self-test passes, receiving user input defining a designated protection territory, of the smart microwave sensor module, establishing a secured area;

verifying that the designated protection territory conforms to the user input;

determining whether the smart microwave sensor module is triggered by a user within the secured area;

sampling signal data from the smart microwave sensor module to detect a velocity, a position, and a moving direction of the user within the secured area;

using the velocity, the position, and the moving direction of the user to track a route of the user within the secured area; and activating or deactivating one or more controlled devices located within the secured area based on the route of the user being within, or outside of, a boundary of the secured area.

2. The method of claim 1 further comprising activating the controlled devices when the of the route of the user is within the secured area.

3. The method of claim 1 further comprising deactivating the controlled devices when the route of the user is outside of the secured area.

4. The method of claim 1 wherein deactivating the controlled devices includes automatically cutting off power to the controlled devices.

5. The method of claim 1 wherein activating the controlled devices includes granting the user control over the controlled devices.

6. The method of claim 1 further comprising:
a cloud server receiving a signal indicative of the route of the user; and
the cloud server activating or deactivating the controlled devices based on the route of the user.

7. The method of claim 1 wherein the controlled devices include at least one of a climate control unit, a light, a printer, and a phone.

8. The method of claim 1, wherein microwave Doppler theory is used to detect the velocity, the position, and the moving direction of the user from the signal data from the smart microwave sensor module.

9. A system comprising:
a smart microwave sensor module; and a
microprocessor unit coupled to the smart microwave sensor module,
wherein the microprocessor unit conducts a self-test of the smart microwave sensor module, wherein, when the self-test fails, the microprocessor outputs a fault warning and, when the self-test passes, the microprocessor receives user input defining a designated protection territory, of the smart microwave sensor module, establishing a secured area;
wherein the microprocessor unit verifies that the designated protection territory conforms to the user input,
wherein the microprocessor unit determines whether the smart microwave sensor module is triggered by a user within the secured area, and
wherein the microprocessor unit samples signal data from the smart microwave sensor module to detect a velocity, a position, and a moving direction of the user within the secured area, uses the velocity, the position, and the moving direction of the user to track a route of the user within the secured area, and activates or deactivates one or more controlled devices located within the secured area based on the route of the user being within, or outside of, a boundary of the secured area.

10. The system of claim 9 wherein the microprocessor unit activates the controlled devices when the route of the user is within the secured area.

11. The system of claim 9 wherein the microprocessor unit deactivates the controlled devices when the route of the user is outside of the secured area.

12. The system of claim 9 wherein deactivating the controlled devices includes automatically cutting off power to the controlled devices.

13. The system of claim 9 wherein activating the controlled devices includes granting the user control over the controlled devices.

14. The system of claim 9 wherein the microprocessor unit transmits a signal indicative of the route of the user to a cloud server, and wherein the cloud server activates or deactivates the controlled devices based on the location of the route of the user.

15. The system of claim 9 wherein the controlled devices include at least one of a climate control unit, a light, a printer, and a phone.

16. The system of claim 9, wherein microwave Doppler theory is used by the microprocessor unit to detect the velocity, the position, and the moving direction of the user from the signal data from the smart microwave sensor module.

\* \* \* \* \*